United States Patent [19]

Haaf et al.

[11] 4,410,651

[45] Oct. 18, 1983

[54] IMPACT RESISTANT POLYPHENYLENE ETHER RESIN COMPOSITIONS

[75] Inventors: William R. Haaf, Voorheesville; Gim F. Lee, Jr., Albany; Sai P. Ting, Delmar, all of N.Y.

[73] Assignee: General Electric Company, Pittsfield, Mass.

[21] Appl. No.: 362,308

[22] Filed: Mar. 26, 1982

[51] Int. Cl.$^3$ ............................................. C08K 5/52
[52] U.S. Cl. .................................. 524/127; 525/68; 525/92; 525/132; 525/905
[58] Field of Search .............. 525/68, 905, 132, 92; 524/127

[56] References Cited

U.S. PATENT DOCUMENTS

| | | | |
|---|---|---|---|
| 3,257,357 | 6/1966 | Stamatoff | 528/212 |
| 3,257,358 | 6/1966 | Stamatoff | 528/212 |
| 3,306,874 | 2/1967 | Hay | 528/212 |
| 3,306,875 | 2/1967 | Hay | 528/212 |
| 3,943,191 | 3/1976 | Cooper et al. | 525/509 |
| 4,166,055 | 8/1979 | Lee, Jr. | 525/92 |

*Primary Examiner*—J. Ziegler
*Attorney, Agent, or Firm*—Hedman, Casella, Gibson, Costigan & Hoare

[57] ABSTRACT

Blends of polyphenylene ether resin and a small amount of certain ethylene copolymers or terpolymers containing hydroxyl and carbonyl functional groups, optionally including impact modifier, are described. These can be molded into articles which possess improved Gardner impact strength. The improvement is considerably greater than that which is achieved by use of the same amount of low density polyethylene.

11 Claims, No Drawings

IMPACT RESISTANT POLYPHENYLENE ETHER RESIN COMPOSITIONS

BACKGROUND OF THE INVENTION

The polyphenylene ether resins constitute a family of high performance engineering thermoplastics possessing outstanding properties which makes them useful and desirable for many applications. These materials and methods for this preparation are described in many publications, including U.S. Pat. Nos. 3,306,874 and 3,306,875 to Allan Hay, and U.S. Pat. Nos. 3,257,357 and 3,257,358 to Gelu Stamatoff.

The polyphenylene ether resins are admixable with rubber modified high impact polystyrene to form blends which can be molded into articles having improved impact strength.

It is known that additional properties of polyphenylene ether resins and blends can be materially upgraded by blending them with certain other polymeric materials. Polyphenylene ether resins alone, when molded, are somewhat brittle and may shatter or fracture upon impact. Also, the relatively high melt viscosity and softening point of the polymer can cause difficulty in processing.

It has been found that polyolefin resins, such as low density polyethylene, can be incorporated in polyphenylene ether resin blends to improve the melt flow. Compositions of this type are disclosed by Lee, Jr. in U.S. Pat. No. 4,166,055. This same additive, in relatively small amounts, is also known to function as an impact modifier, external lubricant and mold release agent for the blends.

INTRODUCTION TO THE INVENTION

It has now been discovered that certain ethylene polymers substituted with one or more carbonyl groups and one or more hydroxy groups, when incorporated in polyphenylene ether resins and blends, result in significantly better Gardner impact strength than the corresponding resin or blend modified with low density polyethylene (LDPE). This result is accomplished, moreover, while maintaining other physical properties important for the moldings.

The polyethylene additives useful for the present kinds of compositions are available from DuPont Company under the trade designation "CXA resins".

The additive is effective is small amounts, with concentration of from 0.1 to about 5 parts per hundred parts of polyphenylene ether resin (or total resinous components) being typical for attainment of the desired benefits.

DESCRIPTION OF THE INVENTION

The polyphenylene oxide resins useful in accordance with the present kinds of compositions are, as previously indicated, individually well known and readily available. There are, however, various preferred composition components. These are primarily ones commonly having applications for which high impact strength is particularly desirable.

The preferred polyphenylene ethers are homo-and copolymers of the formula:

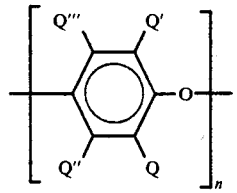

wherein Q, Q',Q" and Q''', are independently selected from the group consisting of hydrogen, hydrocarbon radicals, halohydrocarbon radicals having at least two carbon atoms between the halogen atom and the phenol nucleus, hydrocarbonoxy radicals and halohydrocarboxy radicals having at least two carbon atoms between the halogen atoms and the phenol nucleus, and Q', Q" and Q''', in addition may be halogen with the proviso that Q and Q' are preferably free of a tertiary carbon atom; and n represents the total number of monomer residues and is an integer of at least 50.

Especially preferred is poly(2,6-dimethyl-1,4-phenylene) ether.

The polyphenylene ether resins may be prepared by well known procedures, such as those described in the previously mentioned patents.

The invention can also take the form of compositions, such as blends of polyphenylene ether resin with one or more polymeric modifiers and especially polymeric impact modifiers.

By way of illustration, the impact modifier may be a homopolymer such as polystyrene, polychlorostyrene, poly(alpha-methyl styrene), or poly(para-methyl styrene) or styrenic copolymer such as poly(styrene-co-maleic anhydric) or poly(styrene-co-methyl acrylate) which has been modified by natural or synthetic rubber, for example, polybutadiene, polyisoprene, butyl rubber, EPDM rubber, natural rubber, polysulfide rubbers, polyurethane rubbers, etc., elastomeric styrene copolymers such as styrene-butadiene copolymers, styrene-acrylonitrile-butadiene terpolymers (ABS), block copolymers of styrene and a diene in their various forms, for example, A-B, A-B-A, A-B-AB, A-B-A-B-A, etc., random or radial teleblock copolymers of these same materials, as well as hydrogenated forms of the linear, random and radial copolymers in which the aliphatic unsaturation, e.g., of the "B" (diene) block has been reduced; and admixture of any of the above mentioned styrene homopolymers with any of the above mentioned elastomeric styrene co- and terpolymers.

Blends of the polyphenylene ether resin and impact modifier can contain these materials in virtually any desired proportion, e.g., from 20:1 to 1:20 parts by weight.

The CXA resins are described by DuPont as co- or terpolymers of ethylene with one or more monomers containing polar functional groups. In general, CXA resins useful for purposes of the present invention will preferably possess melt indices ranging from 2 to 40 g/10 min. and especially preferably from 10 to 35 g/10 min., and preferably densities in the range from about 0.92 to about 1.10 g/cc and especially about 0.94 g/cc. Further information regarding the properties of these materials is found in literature available from DuPont.

The compositions can also contain supplementary non-resinous additives customarily employed in polyphenylene ether molding compositions to improve other physical and chemical properties. The additives include flame retardants (for example, triphenyl phosphate or substituted triphenyl phosphate), plasticizers, strengthening fibers triphenyl phosphate) polasticizers, strengthening fibers (for example, glass filaments and graphite whiskers), antioxidants, mold release agents, mineral fillers, pigments, dyes, abrasion resistant components, etc. These are typically included in minor but effective amounts of between 1% and 50% by weight of the total composition.

Preparation of the compositions is accomplished by use of any of the known procedures for polyphenylene ether molding compositions, e.g., such as described in U.S. Pat. No. 4,166,055. Preferably, the ingredients are formed with a blend pre-mix, extruded as on a single or twin screw extruder, cooled, chopped or ground into molding pellets and injection molded into articles of the desired shape and size.

The following examples are presented as an illustration of the invention. These are intended as specific embodiments only and not as a limitation on the scope of the invention. Proportions are stated in parts by weight.

EXAMPLES 1-3

Blends were prepared by tumbling 55 parts of poly(2,6-dimethyl-1,4-phenylene ether) resin (PPO®, General Electric Co.), 45 parts of rubber modified high impact polystyrene (Foster Grant's FG 834, containing about 8–9% of polybutadiene rubber), 1.5 parts of modified ethylene terpolymer (DuPont's CXA resin), 1.0 part of diphenyl decyl phosphite, 3.5 parts of isopropylated triphenyl phosphate flame retardant (FMC's Kronitex® 50), 0.15 part of zinc oxide and 0.15 part of zinc sulfide. The blends were extruded at 570° F. on a 28 mm. Werner Pfleiderer twin screw extruder, cooled, chopped into molding pellets and molding into test bars at an injection temperature of 540° F. (180° F. mold temperature).

For comparison, a corresponding composition, containing low density polyethylene (Rexene 126) in place of CXA, was also prepared, molded at tested under the same conditions, as was a control blend which did not contain either of the two additive types.

physical properties are not adversely affected by use of the terpolymer.

The above mentioned patents and/or publications are incorporated herein by reference. Obviously, other modifications and variations are possible in light of the above disclosure. For instance, instead of poly(2,6-dimethyl-1,4-phenylene ether), copolymers such as poly(2,6-dimethyl-co-2,3,6-trimethyl-1,4-phenylene ether) can be substituted. It is to be understood, therefore, that changes may be made in the particular embodiments shown which are within the full intended scope of the invention as defined in the appended claims.

We claim:
1. A thermoplastic composition comprising
   (a) a polyphenylene ether resin together with a rubber modified high impact polystyrene; and
   (b) a Gardner impact strength improving amount of a copolymer or terpolymer of ethylene containing one or more hydroxyl functional groups and one or more carbonyl functional groups.
2. A composition according to claim 1, in which the polyphenylene ether resin is poly(2,6-dimethyl-1,4-phenylene ether).
3. A composition according to claim 1, in which the rubber is polybutadiene.
4. A composition according to claim 1, which contains from 0.1 to about 5 parts of component (b) for each 100 parts of (a).
5. A composition according to claim 1, in which component (b) is characterized by a melt index from 2 to 40 g/10 min.
6. A composition according to claim 1, in which component (b) is characterized by a melt index from 10 to 35 g/10 min.
7. A composition according to claim 1, in which component (b) has a density in the range from about 0.92 to about 1.10 g/cc.
8. A composition according to claim 1, in which component (b) has a density of about 0.94 g/cc.
9. A composition according to claim 1, which further includes a flame retarding amount of a flame retardant agent.
10. A composition according to claim 9, in which the flame retardant is triphenyl phosphate.

TABLE

| Sample No. | Additive | HDT, °F. | Izod imp. str., ft. lbs./in. n. | Gardner imp. str., in. - lbs. | Melt visc. @ 282° C. 1500 sec.$^{-1}$ | Tensile str., psi | Tensile yield psi | Tensile elong., % | Flexural mod., psi | Flexural str., psi | Flow channel length, inches |
|---|---|---|---|---|---|---|---|---|---|---|---|
| control | — | 253 | 2.1 | 60 | 2800 | 8900 | 10,600 | 51 | 381,000 | 153,000 | 12.5 |
| 1* | Rexene 126 | 252 | 2.6 | 96 | 2900 | 8900 | 10,500 | 58 | 397,000 | 150,000 | 13 |
| 2 | CXA-2002** | 250 | 2.8 | 147 | 3200 | 8700 | 10,300 | 59 | 406,000 | 147,000 | 12.5 |
| 3 | CXA-2022*** | 254 | 2.7 | 153 | 3300 | 9000 | 10,300 | 58 | 381,000 | 147,000 | 12.5 |

*comparison blend
**melt index about 35 g/10 min.
***melt index about 10 g/10 min.

It can be seen that at the same concentration in the composition, the CXA resins result in a considerably greater Gardner impact strength improvement, in comparison with the low density polyethylene. The other 11. A composition according to claim 9, in which the flame retardant is isopropylated triphenyl phosphate.

* * * * *